United States Patent

Waibel et al.

[11] Patent Number: 5,812,243
[45] Date of Patent: Sep. 22, 1998

[54] PHOTOGRAPHIC PRINTING APPARATUS WITH VIDEO CAMERA

[75] Inventors: Hermann Waibel, München; Hans-Georg Schindler, Holzkirchen, both of Germany

[73] Assignee: AGFA-Gevaert AG, Leverkusen, Germany

[21] Appl. No.: 733,019

[22] Filed: Oct. 16, 1996

[30] Foreign Application Priority Data

Oct. 25, 1995 [DE] Germany .................. 195 39 730.4

[51] Int. Cl.[6] ................ G03B 27/80; G03B 27/54
[52] U.S. Cl. ................ 355/38; 355/67; 355/71; 349/223; 358/504; 358/516; 358/521
[58] Field of Search .................. 355/35, 38, 67, 355/55, 71, 69, 40, 41; 358/504, 512, 515, 516, 521; 349/222, 254, 229

[56] References Cited

U.S. PATENT DOCUMENTS

| 4,279,502 | 7/1981 | Thurm et al. . | |
| 5,146,323 | 9/1992 | Kobori et al. | 358/76 |
| 5,182,594 | 1/1993 | Hopson | 355/20 |
| 5,422,740 | 6/1995 | Fujimoto et al. | 358/521 |
| 5,671,041 | 9/1997 | Iwaki | 355/38 |
| 5,689,350 | 11/1997 | Rolleston | 358/504 |
| 5,719,661 | 2/1998 | Terashita | 355/38 |

FOREIGN PATENT DOCUMENTS

0255128 B1  12/1993  European Pat. Off. .

*Primary Examiner*—R. L. Moses
*Assistant Examiner*—Shival Virmanl
*Attorney, Agent, or Firm*—Darby & Darby

[57] ABSTRACT

A photographic color printer includes a color video camera for making specialty prints. A memory is provided to store different color compositions for printing light including an initial color composition and additional color compositions which surround the initial color composition. The memory also stores camera adjustment parameters for each additional color composition so that, when the color composition of the printing light is shifted away from the initial color composition, the camera can be adjusted to the new color composition. The camera is adjusted to the initial color composition by exposing the camera to light of this composition. Following such exposure, the camera is sequentially exposed to light of the various additional color compositions. The camera is adjusted to each additional color composition in order to obtain the camera adjustment parameters which are to be stored in the memory.

21 Claims, 2 Drawing Sheets

PHOTOGRAPHIC PRINTING APPARATUS WITH VIDEO CAMERA

BACKGROUND OF THE INVENTION

The invention relates to a printing or copying apparatus.

The increasing use of electronic image processing has expanded the range of products available to customers from the photographic printing industry. Thus, electronically composed, so-called index prints have been introduced to the market. These allow all of the negatives or frames of a film to be reproduced on a single sheet in reduced size together with the frame numbers so that a customer can place a back order more easily. Electronic image processing is also used to compose class pictures as well as school yearbook pages where individual photographs of students are reproduced, e.g., together with names and ages. Here, it is necessary to scan most of the negatives pointwise before individual prints of the negatives are made.

For the purposes outlined above, photographic printing apparatus are frequently provided with a video camera. See, for instance, the European patent Specification 0 255 128 B1. In such apparatus, the image of a negative to be reproduced is directed to the video camera by a fixed beam splitter in, or a reflector movable into, the optical path. This is particularly advantageous when, as taught in the German patent p 42 30 449, the beam which illuminates the negative during printing or during the production of image signals is adjusted so as to correct color errors. The adjustment is such that the overall color composition of a print made with the beam would be an uncolored or neutral gray. If the beam is adjusted, it becomes necessary to also adjust the video camera. To this end, the amplifications in the three color channels of the video camera are balanced so that three color signals of the same magnitude exist at the outputs of the video camera.

A prerequisite for adjustment of the video camera is that the beam arrive at the latter without being attenuated by a negative. Since the beam travels to the camera by way of the printing window which supports the negatives during printing, this means that the printing window must be free in order to adjust the camera. In a roll printing apparatus where negatives are fed from a continuous band of film wound on a reel, the above prerequisite is readily fulfilled before the film has been unwound from the reel preparatory to starting the printing process. Where the negatives are discrete and are sent to the printing window individually, the prerequisite is fulfilled once a negative on the printing window has been printed and removed.

Severe difficulties arise in a roll printing apparatus when the beam is adjusted while printing a band made up of a large number of films joined end-to-end. Such adjustment is routinely performed during a printing process. Adjustment of the video camera must then wait until the entire band has been printed. Alternatively, the band can be cut which, however, significantly increases the amount of work involved in printing of the band.

SUMMARY OF THE INVENTION

It is an object of the invention to provide a method which allows adjustment of a camera to be carried out during a printing operation.

Another object of the invention is to provide an apparatus which enables adjustment of a camera to be performed while printing, and the adjustment parameters are stored together with the respective additional color compositions.

The method of the invention allows the camera to be at least approximately adjusted to light of different color compositions without exposing the camera to such light. This is made possible by the neutral gray adjustment of the camera for a plurality of color compositions around an initial neutral gray point, and storage of the color compositions together with corresponding adjustment parameters for the camera. Accordingly, if the neutral gray point shifts, it is not necessary to expose the camera to light corresponding to the new neutral gray point and the camera can be adjusted to this point with adequate precision based on the stored adjustment parameters. New printing parameters arising during the printing of a strip or band of masters, e.g., negatives, can therefore be incorporated in the printing operation immediately while maintaining good quality. This may be accomplished without time-consuming cutting of the band in order to expose the camera to light of the new color composition. The new printing parameters can, for example, be stored in a memory for copy material parameters. Further improvements may be achieved by applying an interpolation process to the stored camera adjustment parameters.

Another aspect of the invention resides in a printing apparatus comprising means for generating printing light, means for changing the color composition of light from the generating means, an adjustable color camera, and means for directing light to the camera from the generating means. The apparatus further comprises means for establishing respective adjustment parameters for the camera when exposed to light having different color compositions, and means for storing each of the adjustment parameters together with the respective color composition.

The changing means is preferably automatic and may be designed to change color composition stepwise.

Additional features and advantages of the invention will be forthcoming from the following detailed description of The preceding objects, as well as others which will become apparent as the description proceeds, are achieved by the invention.

One aspect of the invention resides in a method of operating a printing apparatus which includes a color camera, e.g. a color video camera. The method comprises the step of establishing a predetermined color composition such that the overall color of a print made with printing light of the predetermined composition is substantially neutral gray. The method additionally comprises the steps of exposing the camera to light of the predetermined composition, and adjusting the camera so that the overall color of an image produced by the camera from light of the predetermined composition is substantially neutral gray. The method further comprises the steps of exposing the camera to light of a plurality of additional color compositions, and determining at least one adjustment parameter for the camera during exposure to light of each additional composition so that the overall color of an image produced by the camera from light of each additional composition is substantially neutral gray. The method also comprises the step of storing the additional color compositions together with the corresponding adjustment parameters.

The exposing steps may involve moving color filters to respective settings for the predetermined color composition and each of the additional color compositions. The adjusting and determining steps can then be performed using these settings.

The method can further comprise the step of printing an image on copy material, and the adjusting and determining steps may here be carried out using at least one parameter for the copy material. Preferably, the adjusting and determining steps are performed using both a copy material parameter and color filter settings.

In the event that the printing light deviates from the predetermined color composition, the method additionally comprises the step of adapting the camera to the new color composition using the stored adjustment parameters so that the overall color composition of an image produced by the camera from light of the new composition is substantially neutral gray. If the new color composition differs from the additional color compositions, the adapting step comprises interpolation of the additional color compositions and of the adjustment parameters.

The additional color compositions may lie, or be grouped, around the predetermined color composition. It is preferred for the additional color compositions to lie on one or more circles which circumscribe the predetermined color composition. Advantageously, first ones of the additional color compositions lie on a first circle circumscribing the predetermined color composition while second ones of the additional color compositions lie on a second circle circumscribing the first circle. The predetermined color composition and the first additional color compositions may represent a density difference of 0.03 as may the first additional color compositions and the second additional color compositions.

In accordance with the method of the invention, the camera is exposed to light having a predetermined color composition such that the overall color of a print made with the light is neutral gray. The predetermined color composition can be referred to as a neutral gray point, and the camera is adjusted to this point. Thus, the camera is adjusted so that the overall color of an image formed by the camera with light of the predetermined color composition is neutral gray. This neutral gray adjustment can be performed prior to a printing operation. Moreover, the camera is exposed and adjusted to light having a plurality of additional color compositions, and the adjustment for each additional color composition is again a neutral gray adjustment. The additional adjustments can likewise be made prior to a printing operation and can be carried out at the time of the initial neutral gray adjustment. At least one adjustment parameter is determined for each additional color composition, preferred embodiments when read in conjunction with the accompanying drawings.

DESCRIPTION OF THE PREFERRED EMBODIMENTS

Figure 1:
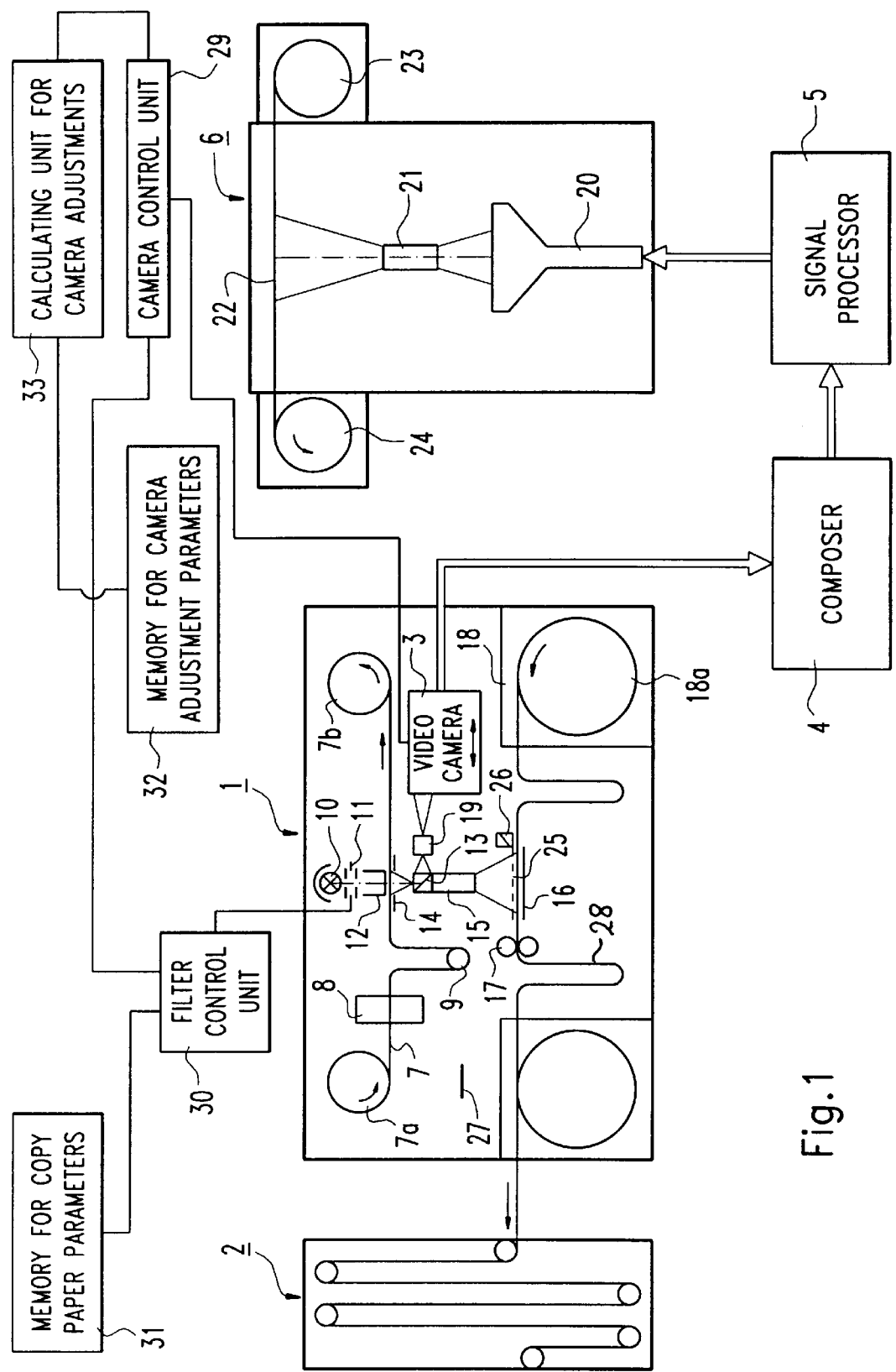
FIG. 1 schematically illustrates a printing installation in accordance with the invention.

Referring to FIG. 1, the numeral 1 identifies a photographic printer or printing apparatus in accordance with the invention. The printer 1 is a roll printer and is provided with one or more supports which rotatably receive a supply reel 7a for an elongated strip or band of color film 7. The film band 7, which is wound on the supply reel 7a, is made up of a large number of exposed and developed individual films joined end-to-end. The film band 7 carries a series of coherent negatives or masters which are to be printed on a band or strip of copy paper or copy material 28 at a printing station in the printer 1. The printing station defines an optical path and includes means for forming an image of a negative in the optical path.

The printer 1 is directly connected to a developing apparatus 2 for the paper band 28 so that the paper band 28 need not be wound on a reel between exposure and development. The images printed or exposed on the paper band 28 in the printer 1 are available as finished prints from the developing apparatus 2 within a very short period of time.

A color video camera 3 is incorporated in the roll printer 1 and has a spectral sensitivity which differs substantially from that of the paper band 28. The camera 3 includes three color channels which have variable amplification and are adjustable by a control unit 29 for the camera 3. The images of negatives at the printing station are directed to the camera 3 which detects, and generates image signals representing, the images. The image signals are sent to a composer 4 and then to a signal processor or signal processing unit 5. From the signal processor 5, the image signals are forwarded to a printing unit or printer 6.

The arrangement of video camera 3, composer 4, signal processor 5 and printing unit 6 is designed to produce index prints. Thus, the image signals generated by the video camera 3 are stored in a memory of the composer 4. The composer 4 then assembles the signals into a composite of images and provides each image with the number of the corresponding negative. The image composite is sent to the signal processor 5 and thereafter to the printing unit 6.

The printing unit 6 includes a cathode ray tube 20 which prints the image composite on a band or strip of copy material or copy paper 22 via an objective 21. The image composite is printed on a section of the band 22 which, after the band 22 is subdivided, forms a single sheet or page. The band 22 is fed stepwise from a supply reel 23 as required and, following exposure, is wound onto a driven take-up reel 24. Once the band 22 has been exposed, the band 22 is developed and cut into sections in a conventional manner. The individual sections, which constitute index prints, are packed together with respective orders for conventional prints.

Considering again the printer 1, the band of film 7 is unwound from the supply reel 7a for printing. As the band 7 is unwound, the band 7 travels through a scanner 8 where the negatives of the band 7 are scanned pointwise in the three primary colors red, green and blue. The scanner 8 is located upstream of the printing station, and all the negatives of an individual film are advantageously scanned before the leading end of the film enters the printing station. The three density values obtained in the scanner 8 for a point of the band 7 are stored in a non-illustrated memory together with the location of the corresponding point on the respective individual film. The memory is connected to a non-illustrated exposure control unit which, calculates the amount of printing light in each primary color for each negative individually. The calculations can, for instance, be performed in accordance with the teachings of U.S. Pat. No. 4,279,502. When a negative reaches the printing station, the exposure control unit generates appropriate control signals so that the negative is printed using the calculated amounts of printing light. Between the scanner 8 and the printing station is a buffer zone 9 for the band 7 in which the band 7 forms a loop.

As mentioned previously, the printing station defines an optical path. Starting from the upstream end of the optical path, the printing station includes a light source 10 which is followed by coloring unit or arrangement 11 serving to adjust the color composition of the light emanating from the light source 10. The coloring unit 11 comprises three filters of maximum density in the subtractive colors cyan, magenta and yellow. Depending upon the color composition of a negative in the printing station, the filters are moved into the optical path to a greater or lesser degree.

Movement of the filters is controlled by a filter control unit 30 which is capable of changing the color composition of the light from the light source 10 in steps. The filter control unit 30 functions to change the settings of the filters when the color composition is to be changed. The filter control unit 30 is connected to a memory 31 for copy paper parameters to allow the printing light to be adjusted to the copy paper. Further, the filter control unit 30 is connected to the camera control unit 29. Thus, camera adjustment parameters can be selected and/or calculated in accordance with filter settings and/or copy paper parameters.

Downstream of the coloring unit 11 is a reflecting shaft or light shaft 12 having an inlet end which faces the coloring unit 11 and an outlet end remote from the coloring unit 11. The reflecting shaft 12, which functions to achieve a uniform light distribution, can be provided with a diffusing disc at the outlet end thereof. Following the reflecting shaft 12 is a platform or support for the band 7. The platform has a printing window 14 which frames a negative during printing. The band 7 is conveyed through the printing station and, beyond the latter, is wound onto a driven take-up reel 7b. The take-up reel 7b constitutes, or constitutes part of, a means for transporting the band 7 through the printer 1 along a predetermined path.

The printing window 14 is followed by an uncoupling reflector 13 constituted by a beam splitter which is inclined to the optical path at an angle of 45 degrees. The beam splitter 13 reflects part of the light from the printing window 14 to an objective 19 which focuses a negative in the printing window 14 on the video camera 3. The camera 3 can be a three-chip camera containing three flat CCDs as well as appropriate beam splitters which cause the red component of incoming light to impinge one of the CCDs, the green component to impinge another of the CCDs and the blue component to impinge the third of the CCDs. Alternatively, the camera 3 can be a single-chip camera having CCD pixels provided with different filters which cause each of the CCD pixels to be sensitive to one of the three primary colors. The CCD pixels can generate image signals for the three primary colors either simultaneously or sequentially. For very small index prints, the resolution of a single-chip camera is sufficient.

Downstream of the beam splitter 13 along the optical path is an objective 15 which focuses a negative in the printing window 14 on a section of the paper band 28 which is located in the printing station and is supported on a platform. The paper band 28 is fed to the printing station from a supply reel 18a disposed in a cassette 18. Transport rollers 17 serve to feed the paper band 28 from the supply reel 18a into and through the printing station. The transport rollers 17 constitute, or constitute part of, a means for conveying the paper band 28 through the printer 1 along a predetermined path. The paper band 28 is exposed in the printing station and, after leaving the latter, travels into the developing apparatus 2. Alternatively, the paper band 28 may be wound onto a take-up reel of a storage cassette upon exiting the printing station.

Between the objective 15 and the path of the paper band 28 is a gray test negative 25 illustrated in broken lines. The test negative 25 is pivotable between a position in the optical path and a position outside of the optical path. In the former position, the test negative 25 is located intermediate the objective 15 and the path of the paper band 28. A drive magnet 26 serves to pivot the test negative 25 from one position to the other. The test negative 25 is brought into the optical path when no negative is present in the printing window 14 and it is desired to calibrate the printer 1 by way of a calibration print.

During normal operation, the printer 1 is calibrated at predetermined intervals, e.g., every two hours. When such an interval has elapsed since the last calibration, the test negative 25 is brought into the printing position, i.e., into the optical path, at the next opportunity. This opportunity will generally arise when a film band 7 being fed from the supply reel 7a has passed through the printing station in its entirety. Once the test negative 25 is in the printing position, the test negative 25 is exposed to light in the three primary colors. This light has the same known color composition as the printing light used for the band 7. The color composition of the printing light, that is, the amount of light in each primary color, is normally selected so that the overall color of a print made with the printing light is an uncolored or neutral gray.

As a rule, the test negative 25 is a gray step wedge having a middle zone which, when exposed to light of the same color composition as the printing light for the band 7, yields a first print with a density of 0.75 and a second print with a density of 1.0.

Once the paper band 28 has been printed with an image of the test negative 25 at the printing station, the exposed section of the paper band 28 is sent to the developing apparatus 2. Meanwhile, a reel 7a with a new film band 7 is mounted in the printer 1 and the printing operation resumed.

After about 10 minutes, a print of the test negative 25 is obtained. This test print is inserted in a slot 27 of a densitometer which automatically evaluates the test print. The densitometer indicates, e.g., on a display, whether a color shift has occurred in the combination of the printer 1 and the developing apparatus 2. In other words, the densitometer indicates whether the neutral gray point has changed so that the overall color of a print produced with printing light of the original color composition is no longer an uncolored or neutral gray. If this is the case, the densitometer further indicates the direction and magnitude of the color shift and awaits a decision by an operator as to whether an appropriate correction is to be made to the printer 1. In response to a yes command from the operator, the correction is entered directly in a memory 31 for copy paper parameters via suitable control pulses. The color composition of the printing light is then changed by the filter control unit 30 in such a manner that the overall color of a print produced with the printing light is again an uncolored or neutral gray.

When the paper parameter memory 31 and the neutral gray point are changed, the video camera 3 is no longer adjusted to the printing light. Thus, the overall color of an image made by the camera 3 with printing light of the new color composition will not be an uncolored or neutral gray. In order to readjust the camera 3, it has heretofore been necessary to expose the camera 3 to light of the new color composition and to then adjust the amplifiers in the three color channels of the camera 3 so that the output signals of the channels have the same magnitude. Proper adjustment of the camera 3 requires that the light arriving at the camera 3 from the optical path of the printer 1 be unattenuated by a negative. However, in a roll printer like the printer 1, this is possible only after a film band 7 which is in the process of being unwound from the reel 7a has been printed in its entirety and the end of the film band 7 has passed by the printing window 14.

The invention allows the camera 3 to be adjusted during the printing of a film band 7. In accordance with the invention, the printer 1 is initially calibrated, and the camera 3 initially adjusted, as usual before a printing operation. Following the initial calibration and initial adjustment, but prior to starting the printing operation, the camera 3 is exposed to light having a plurality of color compositions which differ from and lie around the initial neutral gray point. Adjustment parameters for the three color channels of the camera 3 are determined for each additional color composition. The adjustment parameters for an additional color composition are selected in such a manner that the overall color of an image formed by the camera 3 with light of the respective color composition is an uncolored or neutral gray. The adjustment parameters for each color composition are stored together with the corresponding color composition in a memory 32 for camera adjustment parameters.

Figure 2:
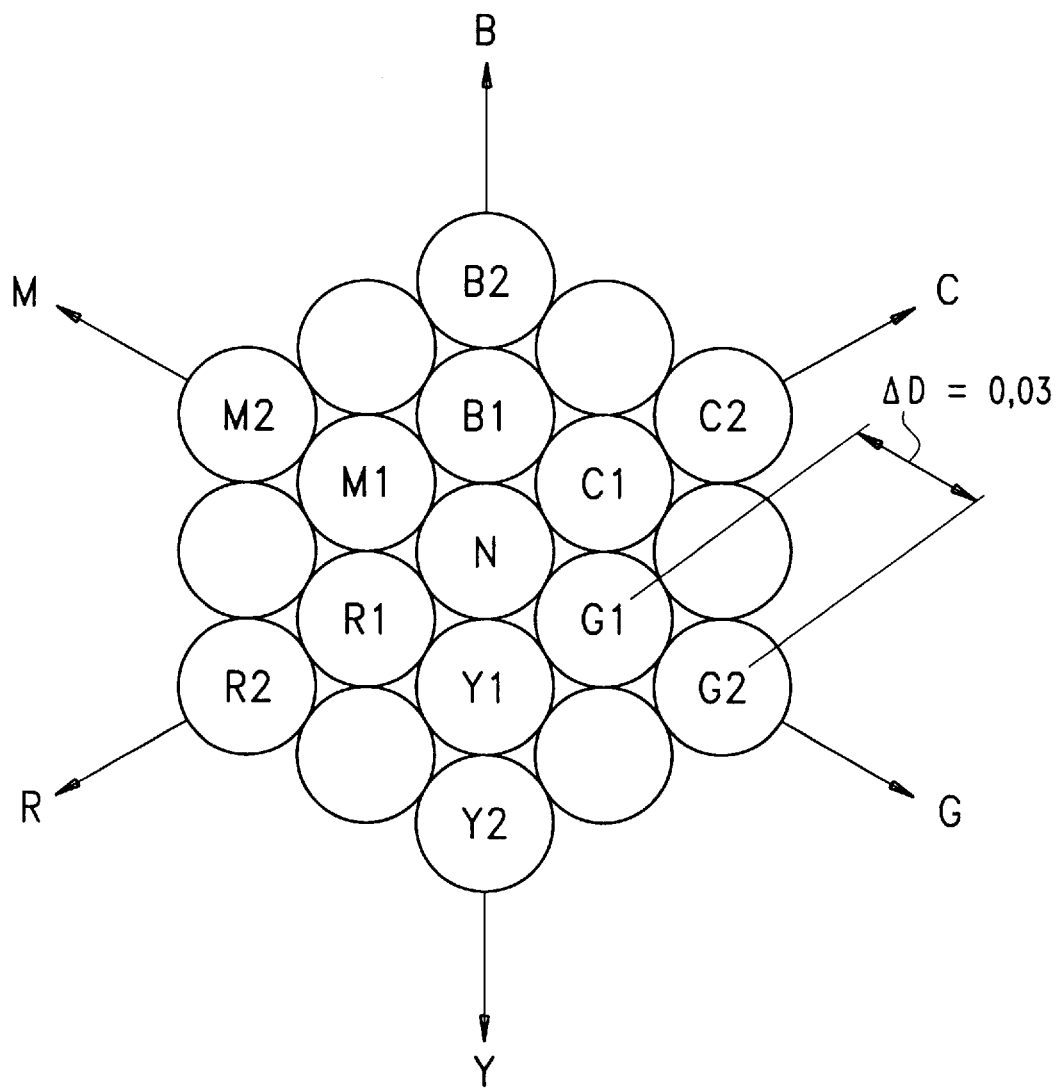
FIG. 2 illustrates the principle of a method according to the invention.

Referring to FIG. 2, the letter B denotes blue, the letter C cyan, the letter G green, the letter Y yellow, the letter R red and the letter M magenta. The letter N represents the initial neutral gray point.

As shown in FIG. 2, the additional color compositions preferably lie on one or more circles circumscribing the initial neutral gray point N. Advantageously, the additional color compositions lie on two circles including an inner circle with the additional color compositions B1, C1, G1, Y1, R1 and M1 and an outer circle with the color compositions B2, C2, G2, Y2, R2 and M2. The outer circle circumscribes the inner circle and the initial neutral gray point N constitutes the center of the circles.

Each of the letters B, C, G, Y, R, M represents an axis. The B axis is directed upward so that deviations from the initial neutral gray point N upward are towards blue; the G axis is directed downward and to the right so that deviations from the initial neutral gray point N downward and to the right are towards green; and the R axis is directed downward and to the left so that deviations from the initial neutral point N downward and to the left are towards red. Similarly, the C axis is directed upward and to the right so that deviations from the initial neutral gray point N upward and to the right are towards cyan; the Y axis is directed downward so that deviations from the initial neutral gray point N downward are towards yellow; and the M axis is directed upward and to the left so that deviations from the initial neutral gray point N upward and to the left are towards magenta. The C axis bisects the angle between the B and G axes, the Y axis bisects the angle between the G and R axes, and the M axis bisects the angle between the R and B axes.

A brightness or intensity difference exists between the initial neutral gray point N and the inner circle as well as between the inner and outer circles. This difference can, for instance, correspond to one correction step of a conventional printer which is equivalent to a density difference of 0.03 as illustrated in FIG. 2.

In operation, the printer 1 is initially calibrated, and the video camera 3 initially adjusted, prior to the start of a printing operation. Calibration of the printer 1 yields the initial neutral gray point N for the particular combination of the printer 1, the copy paper 28 and the developing apparatus 2.

Following the initial calibration and adjustment, the filter control unit 30 automatically changes the color composition of the printing light from N to B1 thereby increasing the blue density by 0.03. The camera control unit 29 then adjusts the camera 3 to the color composition B1 and the adjustment values or parameters required to accomplish this are stored in the memory 32 together with the color composition B1.

The same procedure is followed for each of the color compositions C1, G1, Y1, R1, M1 of the inner circle and each of the color compositions B2, C2, G2, Y2, R2, M2 of the outer circle.

The outer circle contains several blanks. If the differences between color compositions are not unduly great, values for these blanks can be obtained by interpolation.

If now a test exposure is made through the test negative 25 upon completion of the printing of a film band 7, a test print is obtained after about 10 minutes and is placed in the densitometer for evaluation. At this point, printing of a new film band 7 is already in process so that, if a shift in the color composition of the printing light is indicated, the video camera 3 cannot be exposed to unattenuated light of the new color composition for adjustment.

To adjust the camera 3 to the new color composition, a calculating unit 33 compares the new color composition with the color compositions N, B1, C1, G1, Y1, R1, M1, B2, C2, G2, Y2, R2, M2 stored in the memory 32. The calculating unit 33 then computes the adjustments required for the color channels of the camera 3 from the adjustment parameters stored in the memory 32 and sends appropriate control signals to the camera control unit 29 which makes the adjustments.

Assuming that a color vector corresponding to the new color composition lies between B1 and M1 in FIG. 2, the calculating unit 33 performs an interpolation based on the color compositions N, B1, M1 and an interpolation based on the adjustment parameters for the color compositions B1, M1. These interpolations yield precise adjustments for the color channels of the camera 3. The calculated adjustments allow the camera 3 to be adjusted to the new color composition without exposing the camera 3 to unattenuated light of the new color composition. The camera 3 can be adjusted without a risky wait for completion of a printing operation and without time-consuming cutting of a film band 7 which is in the process of being printed.

Various modifications are possible within the meaning and range of equivalence of the appended claims.

We claim:

1. A method of operating a printing apparatus which includes a color camera, said method comprising the steps of establishing a predetermined color composition such that the overall color of a color print made with printing light of said predetermined composition is substantially neutral gray; exposing said camera to light of said predetermined composition; adjusting said camera so that the overall color of an image produced by said camera from light of said predetermined composition is substantially neutral gray; exposing said camera to light of a plurality of additional color compositions; determining at least one adjustment parameter for said camera for light of each additional composition so that the overall color of an image produced by said camera from light of each additional composition is substantially neutral gray; and storing each additional composition together with the corresponding adjustment parameter or parameters.

2. The method of claim 1, wherein the exposing steps comprise moving color filters to respective settings for said predetermined color composition and each of said additional color compositions, the adjusting and determining steps being performed using said settings.

3. The method of claim 2, further comprising the step of printing an image on copy material, the adjusting and determining steps being performed using at least one parameter for said copy material.

4. The method of claim 1, further comprising the step of printing an image on copy material, the adjusting and determining steps being performed using at least one parameter for said copy material.

5. The method of claim 1 for use where the printing light deviates from said predetermined composition and takes on another color composition, further comprising the step of adapting said camera to said other color composition using said adjustment parameters so that the overall color of an image produced by said camera from light of said other composition is substantially neutral gray.

6. The method of claim 5, wherein said other composition differs from said additional compositions and the adapting step comprises interpolation of said adjustment parameters.

7. The method of claim 1, wherein said additional compositions lie around said predetermined composition.

8. The method of claim 7, wherein said additional compositions lie on at least one circle circumscribing said predetermined composition.

9. The method of claim 8, wherein said predetermined composition and said additional compositions of said one circle correspond to a density difference of substantially 0.03.

10. The method of claim 7, wherein first ones of said additional compositions lie on a first circle circumscribing said predetermined composition and second ones of said additional compositions lie on a second circle circumscribing said first circle.

11. The method of claim 10, wherein said predetermined composition and said first additional compositions correspond to a density difference of substantially 0.03, said first additional compositions and said second additional compositions also corresponding to a density difference of substantially 0.03.

12. The method of claim 1, wherein said camera is a video camera.

13. A printing apparatus, comprising means for generating printing light; an adjustable color camera; means for directing light to said camera from said generating means; means for changing the color composition of light from said generating means; means for establishing respective adjustment parameters for said camera when said camera is exposed to light having different color compositions; and means for storing each of the adjustment parameters together with the respective color composition.

14. The apparatus of claim 13, wherein said changing means comprises a plurality of color filters and control means for moving said filters, said establishing means including means for adjusting said camera, and said control means being connected to said adjusting means.

15. The apparatus of claim 14, further comprising storage means for copy material parameters, said storage means being connected to said control means.

16. The apparatus of claim 13, wherein said establishing means comprises means for adjusting said camera; and further comprising storage means for copy material parameters, said storage means being connected to said control means.

17. The apparatus of claim 13, wherein said changing means is automatic.

18. The apparatus of claim 13, wherein said changing means comprises means for changing color composition stepwise.

19. The apparatus of claim 13, further comprising means for supporting a reel of masters to be printed and conveying the masters by said generating means.

20. The apparatus of claim 13, wherein said establishing means comprises means for adjusting said camera; and further comprising means for determining an adjustment for said camera when the color composition of light from said generating means deviates from a predetermined color composition, said determining means being designed to determine the adjustment using the adjustment parameters, and said adjusting means being arranged to perform said adjustment.

21. The apparatus of claim 20, wherein said determining means comprises means for interpolating the adjustment parameters.

* * * * *